June 11, 1940.    G. S. CROCKETT    2,204,070
STEERING DEVICE
Filed May 13, 1939

INVENTOR.
Guy S. Crockett
BY Hull, Brock & West
ATTORNEYS.

Patented June 11, 1940

2,204,070

UNITED STATES PATENT OFFICE 2,204,070

STEERING DEVICE

Guy S. Crockett, Moreland Hills, Ohio

Application May 13, 1939, Serial No. 273,523

7 Claims. (Cl. 74—552)

The primary purpose of my invention is to provide a steering device for automotive vehicles that has a yielding, shock absorbing part normally situated in opposed relation to the driver's seat so that in case of a sudden stop or collision, and, as a result, the driver is thrown forwardly with violence, he will be protected by said yielding and shock absorbing part from injurious contact with rigid elements of the vehicle structure.

A further object is to provide a steering device of such nature that a person may get into and out of the vehicle behind such device with ease and convenience.

Figure 1:
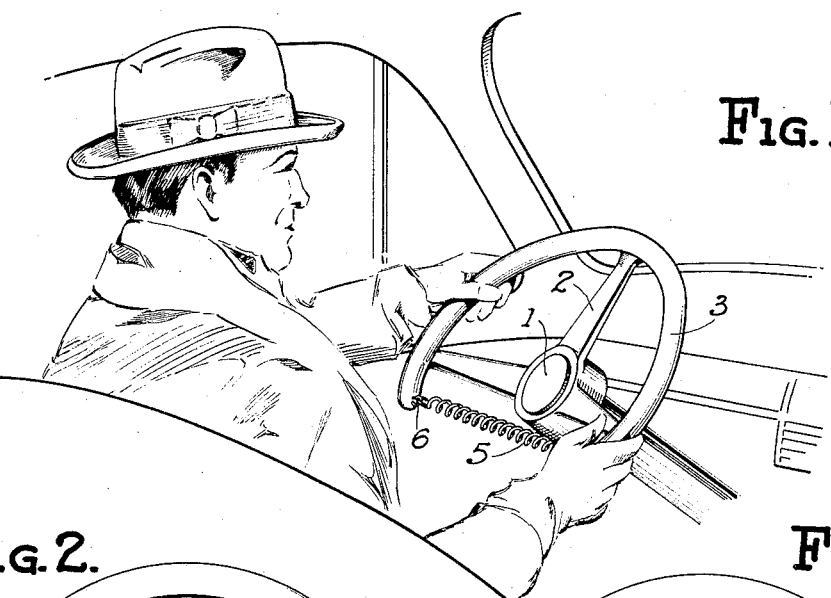
Figure 2:
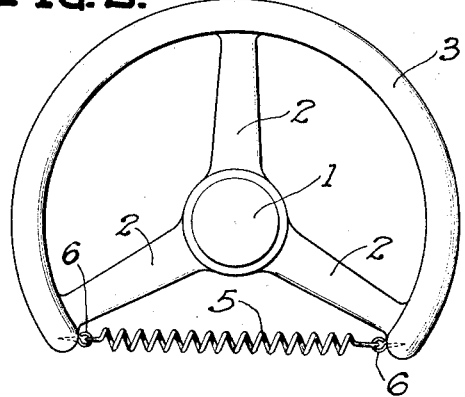

The foregoing objects and advantages, with others hereinafter appearing, including simplicity of construction, economy of manufacture, and neatness of appearance, are attained in the embodiments of the invention illustrated in the accompanying drawing wherein Fig. 1 is a perspective view showing an installation of one form of the invention and the manner in which it is used; Fig. 2 is a plan view of the device shown in Fig. 1, and Figs. 3, 4 and 5 are similar views of modifications of the invention.

According to the embodiment illustrated in Figs. 1 and 2, my improved steering device comprises a spider, made up of a hub 1 and spokes 2, and carrying a segmental rim 3. Secured to and stretched tautly between the ends of the segmental rim 3 is a relatively stiff coil spring 5, the same being shown as having its ends anchored to the rim through eyes 6. The hub 1 is adapted to be secured to the steering post of the vehicle in such relation thereto that the spring 5 is in opposed relation to the driver's seat when the front or steering wheels of the vehicle are in substantially straight-ahead position.

It is seldom that a sudden stop has to be made, when running at high speed, that the vehicle is not traveling in a straight course; and likewise collisions of any consequence occur under similar circumstances. Therefore, in the event of a sudden stop or collision severe enough to throw the driver forwardly with violence, he will be stopped by the yielding, shock absorbing spring 5 without contacting any rigid part of the structure and thus protected from injury.

Figure 3:
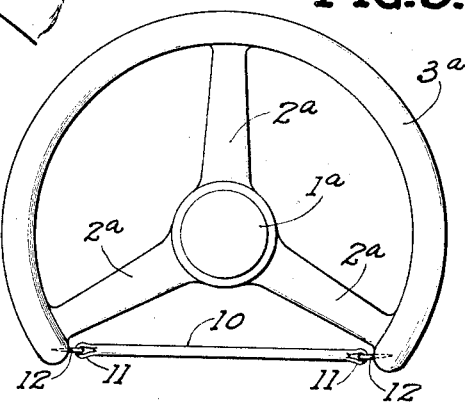

The form of the invention illustrated in Fig. 3 differs from that just described in that an elastic element 10 is substituted for the spring 5 and is attached, by clips 11, to eyes 12 that are carried by the ends of the segmental rim 3ª. As in the former case, the rim 3ª is rigidly secured to and supported from the hub 1ª by the spokes 2ª. The elastic element 10 may consist of a heavy strip of rubber, or a piece of suitable woven elastic, or other similar material, and it is stretched taut when attached to the rim so as to offer sufficient resistance to the inertia of the driver's body to arrest movement before contact is had with the rigid portions of the structure.

Figure 4:
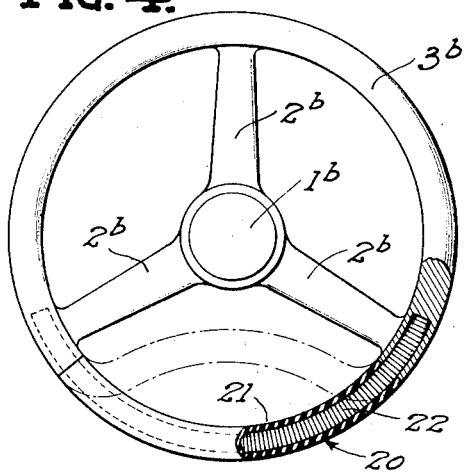

According to the modification illustrated in Fig. 4, the ends of the rigid segmental rim 3ᵇ, that is supported by the spokes 2ᵇ from the hub 1ᵇ, are bridged by a yielding section 20 of approximately the same radius as the rim 3ᵇ, thus making a complete annular structure simulating a standard steering wheel. The yielding, shock-absorbing portion 20 may consist of a body or casing 21 of comparatively soft rubber that encloses a relatively stiff coil spring 22 whose ends are suitably secured to the ends of the rigid segmental rim 3ᵇ, as by having the ends of said spring molded or cast within the rigid rim section, provided it is of plastic material, or secured within sockets thereof. In this case, the entire rim of the wheel may be used in the customary manner for steering, the portion 20 preferably being sufficiently stiff to serve such purpose, yet yielding enough to assume such a condition as that illustrated in dotted lines in case the driver is thrown against the wheel. The portion 20 may also be sprung out of the way to facilitate getting into and out of the vehicle behind the wheel.

Figure 5:
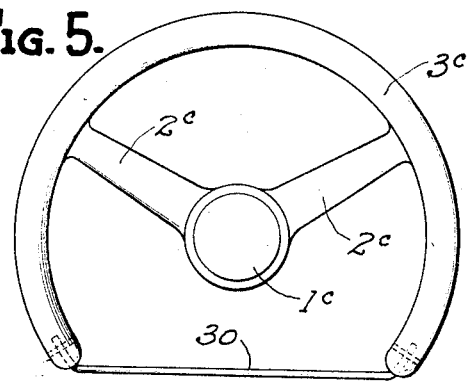

In Fig. 5 a segmental rim 3ᶜ is secured throughout its central portion to a rigid spider comprising spokes 2ᶜ and hub 1ᶜ. Stretched between the ends of the segmental rim is a flexible but non-elastic band 30, desirably of metal, the ends of the band being securely fastened in any suitable manner to the ends of the rim. In this case, the segmental rim 3ᶜ is made of material that is sufficiently resilient to allow its free ends to approach each other when weight is thrown against the band 30, thereby to absorb the shock.

Having thus described my invention, what I claim is:

1. A steering device for automotive vehicles comprising a unit adapted for attachment to the steering post of the vehicle in a given relation thereto, the peripheral portion of said unit being substantially rigid throughout a material part of its circumference and yielding for the remainder thereof, the yielding part being in opposed relation to the driver's seat when the steering wheels of the vehicle are in substantially straight-ahead position.

2. A steering device for automotive vehicles comprising a spider adapted for attachment to the steering post of the vehicle in a given relation thereto, a substantially rigid segmental rim mounted upon the spider with its open side adjacent the driver's seat when the steering wheels of the vehicle are in substantially straight-ahead position, and a yielding element disposed across the open side of the segmental rim.

3. A steering device for automotive vehicles comprising a spider adapted for attachment to the steering post of the vehicle in a given relation thereto, a substantially rigid segmental rim mounted upon the spider with its open side adjacent the driver's seat when the steering wheels of the vehicle are in substantially straight-ahead position, and an elastic element stretched between and attached at its ends to the ends of the segmental rim.

4. A steering device for automotive vehicles comprising a spider adapted for attachment to the steering post of the vehicle in a given relation thereto, a substantially rigid segmental rim mounted upon the spider with its open side adjacent the driver's seat when the steering wheels of the vehicle are in substantially straight-ahead position, and a relatively heavy coiled spring stretched between and having its ends anchored to the ends of the segmental rim.

5. A steering device for automotive vehicles comprising a spider adapted for attachment to the steering post of the vehicle in a given relation thereto, and an annular rim mounted upon the spider, the same being flexible for a material part of its circumference, the flexible part being adjacent the driver's seat when the steering wheels of the vehicle are in substantially straight-ahead position.

6. A steering device for automotive vehicles comprising a spider adapted for attachment to the steering post of the vehicle in a given relation thereto, a substantially rigid segmental rim mounted upon the spider with the space between its ends disposed adjacent the driver's seat when the steering wheels of the vehicle are in substantially straight-ahead position, and an element of substantially the same radius as said segmental rim disposed between the ends thereof, said element consisting of a flexible reinforcing member that is secured at its ends to the ends of the segmental rim, and a covering therefor of pliable material.

7. A steering device for automotive vehicles comprising a spider adapted to be secured to the steering post of the vehicle in a given relation thereto, a segmental rim mounted upon said spider with considerable of its end portions free from said spider, said end portions being resilient so as to be capable of yielding in a direction toward and from each other, and a flexible band disposed between and secured at its ends to the ends of the segmental rim.

GUY S. CROCKETT.